(12) United States Patent
Li

(10) Patent No.: US 10,268,504 B2
(45) Date of Patent: Apr. 23, 2019

(54) INTERRUPT INFORMATION PROCESSING METHOD, VIRTUAL MACHINE MONITOR, AND INTERRUPT CONTROLLER

(71) Applicant: Huawei Technologies Co., Ltd., Shenzhen (CN)

(72) Inventor: Bo Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 15/367,417

(22) Filed: Dec. 2, 2016

(65) Prior Publication Data

US 2017/0083363 A1 Mar. 23, 2017

Related U.S. Application Data

(63) Continuation of application No. PCT/CN2015/075379, filed on Mar. 30, 2015.

(30) Foreign Application Priority Data

Jun. 4, 2014 (CN) .......................... 2014 1 0245858

(51) Int. Cl.
  *G06F 9/455* (2018.01)
  *G06F 9/48* (2006.01)
(52) U.S. Cl.
  CPC ............ *G06F 9/48* (2013.01); *G06F 9/45533* (2013.01); *G06F 9/45558* (2013.01); *G06F 9/4812* (2013.01); *G06F 2009/45579* (2013.01)
(58) Field of Classification Search
  None
  See application file for complete search history.

(56) References Cited

U.S. PATENT DOCUMENTS 7,975,267 B2 7/2011 Bennett et al.
2012/0331467 A1 12/2012 Neiger et al.
(Continued)

FOREIGN PATENT DOCUMENTS

CN 101004726 A 7/2007
CN 101135997 A 3/2008
(Continued)

OTHER PUBLICATIONS

Foreign Communication From a Counterpart Application, Chinese Application No. 201410245858.4, Chinese Office Action dated Apr. 3, 2018, 7 pages.
(Continued)

*Primary Examiner* — Wissam Rashid
(74) *Attorney, Agent, or Firm* — Conley Rose, P.C.

(57) ABSTRACT

An interrupt information processing method, a virtual machine monitor, and an interrupt controller. The method includes receiving Q pieces of first interrupt information and obtaining a corresponding interrupt processing function from a specific register according to an interrupt number of each piece of first interrupt information. Calling the obtained interrupt processing function to obtain M pieces of second interrupt information. Obtaining an identifier of a virtual machine corresponding to the M pieces of second interrupt information. Writing the M pieces of second interrupt information and the identifier of the virtual machine into a virtual CPU interrupt interface such that after determining that the virtual machine is running, the virtual CPU interrupt interface sends the M pieces of second interrupt information to a processor corresponding to the virtual machine. Technical solutions provided in the embodiments of the present disclosure are used to improve interrupt information processing efficiency.

11 Claims, 5 Drawing Sheets

(56) References Cited

U.S. PATENT DOCUMENTS

2015/0205736 A1   7/2015  Neiger et al.
2015/0212956 A1*  7/2015  Tsirkin .................... G06F 13/34
                                                           710/263

FOREIGN PATENT DOCUMENTS

| CN | 101201752 A | 6/2008 |
| CN | 101557420 A | 10/2009 |
| EP | 1804164 A1 | 7/2007 |

OTHER PUBLICATIONS

Foreign Communication From a Counterpart Application, PCT Application No. PCT/CN2015/075379, English Translation of International Search Report dated Jun. 29, 2015, 2 pages.
Foreign Communication From a Counterpart Application, PCT Application No. PCT/CN2015/075379, English Translation of Written Opinion dated Jun. 29, 2015, 6 pages.
Gordon, A., et al. "ELI: Bare-Metal Performance for I/O Virtualization," ASPLOS'12, XP055226063, Mar. 3-7, 2012, pp. 411-422.
Ahmad, I., et al. "vIC: Interrupt Coalescing for Virtual Machine Storage Device IO," XP055411628, Jun. 2011, 14 pages.
Foreign Communication From a Counterpart Application, European Application No. 15804037.8, Extended European Search Report dated Oct. 11, 2017, 10 pages.

\* cited by examiner

INTERRUPT INFORMATION PROCESSING METHOD, VIRTUAL MACHINE MONITOR, AND INTERRUPT CONTROLLER

CROSS-REFERENCE TO RELATED APPLICATIONS

This application is a continuation of International Application No. PCT/CN2015/075379, filed on Mar. 30, 2015, which claims priority to Chinese Patent Application No. 201410245858.4, filed on Jun. 4, 2014, both of which are hereby incorporated by reference in their entireties.

TECHNICAL FIELD

The present disclosure relates to the information processing technologies, and in particular, to an interrupt information processing method, a virtual machine monitor, and an interrupt controller.

BACKGROUND

In the prior art, when a central processing unit (CPU) of a computer is in a virtual machine monitor mode, a method that the CPU is used as a virtual machine monitor to inject interrupt information into a virtual machine is as follows. A pointer of a register may point to addresses of different interrupt vector tables. When the pointer points to an address of an interrupt vector table corresponding to the virtual machine monitor, the virtual machine monitor may use an interrupt processing function included in the interrupt vector table. When the pointer points to an address of an interrupt vector table corresponding to the virtual machine, the virtual machine may use an interrupt processing function included in the interrupt vector table. When the pointer points to an address of an interrupt vector table corresponding to an operating system of the computer, the operating system of the computer may use an interrupt processing function included in the interrupt vector table. When the virtual machine is running, the virtual machine calls an interrupt processing function in an interrupt vector table to process interrupt information. When the virtual machine monitor needs to inject interrupt information into the virtual machine, the virtual machine needs to stop running first and exit from calling the interrupt processing function in the interrupt vector table, and then the pointer of the register points to the address of the interrupt vector table corresponding to the virtual machine monitor such that the virtual machine monitor can call the interrupt processing function in the interrupt vector table so as to inject the interrupt information into the virtual machine.

However, an exit event of the virtual machine occurs each time a virtual machine controller injects one piece of interrupt information into the virtual machine. Therefore, since the virtual machine controller can inject only one piece of interrupt information into the virtual machine at a time, when there is a relatively large amount of interrupt information, excessive exit events of the virtual machine are caused, which increases additional performance overheads and causes relatively low interrupt information processing efficiency.

SUMMARY

Embodiments of the present disclosure provide an interrupt information processing method, a virtual machine monitor, and an interrupt controller so as to improve interrupt information processing efficiency.

According to a first aspect, an embodiment of the present disclosure provides an interrupt information processing method, where the method is applied to a system that includes an interrupt controller, a virtual machine monitor, a specific register, and at least one virtual machine, where the interrupt controller includes at least one virtual CPU interrupt interface, the specific register stores an interrupt vector table of the virtual machine monitor, the interrupt vector table of the virtual machine monitor includes an interrupt processing function that is used to be called by the virtual machine monitor, and the interrupt processing function includes an interrupt number. The method includes receiving, by the virtual machine monitor, Q pieces of first interrupt information, where Q is an integer greater than or equal to 1, obtaining, by the virtual machine monitor, a corresponding interrupt processing function from the specific register according to an interrupt number of each piece of first interrupt information, calling, by the virtual machine monitor, the obtained interrupt processing function to obtain M pieces of second interrupt information, where the M pieces of second interrupt information are interrupt information that needs to be sent to a processor corresponding to a virtual machine and that is in the Q pieces of first interrupt information, and M is a positive integer less than or equal to Q, obtaining, by the virtual machine monitor, an identifier of a virtual machine corresponding to the M pieces of second interrupt information, and writing, by the virtual machine monitor, the M pieces of second interrupt information and the identifier of the virtual machine corresponding to the M pieces of second interrupt information into the virtual CPU interrupt interface such that after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

In a first possible implementation manner of the first aspect, writing, by the virtual machine monitor, the M pieces of second interrupt information and the identifier of the virtual machine corresponding to the M pieces of second interrupt information into the virtual CPU interrupt interface includes buffering, by the virtual machine monitor, the M pieces of second interrupt information, detecting, by the virtual machine monitor, a quantity K of third interrupt information currently stored in the virtual CPU interrupt interface, where K is an integer greater than or equal to 0, obtaining, by the virtual machine monitor, N pieces of second interrupt information with highest priorities from the M pieces of second interrupt information according to the quantity K of the third interrupt information and a preset interrupt quantity threshold P of the virtual CPU interrupt interface, where P is an integer greater than or equal to 1, and N is less than or equal to a difference between P and K, and writing, by the virtual machine monitor, the N pieces of second interrupt information and an identifier of a virtual machine corresponding to the N pieces of second interrupt information into the virtual CPU interrupt interface, where N is less than or equal to the difference between P and K.

With reference to the first possible implementation manner of the first aspect, in a second possible implementation manner of the first aspect, each virtual CPU interrupt interface includes a first register and a second register and writing, by the virtual machine monitor, the N pieces of second interrupt information and an identifier of a virtual machine corresponding to the N pieces of second interrupt information into the virtual CPU interrupt interface includes writing, by the virtual machine monitor, the N pieces of second interrupt information into the first register such that the first register sorts the N pieces of second interrupt information in descending order of priorities to obtain a sorting result, and writing R pieces of second interrupt information with highest priorities in the N pieces of second interrupt information into the second register according to the sorting result, where after determining that the virtual machine corresponding to the identifier of the virtual machine is running, the virtual CPU interrupt interface sends the R pieces of second interrupt information to the processor corresponding to the virtual machine, where R is a positive integer less than or equal to N.

In a third possible implementation manner of the first aspect, calling, by the virtual machine monitor, the obtained interrupt processing function to obtain M pieces of second interrupt information includes calling, by the virtual machine monitor, the obtained interrupt processing function such that the called interrupt processing function starts to run and detects an operation location corresponding to each piece of first interrupt information and location information of each virtual machine so as to obtain M pieces of first interrupt information whose operation locations fall within the location information of the virtual machine, and using, by the virtual machine monitor, the obtained M pieces of first interrupt information as the M pieces of second interrupt information.

According to a second aspect, an embodiment of the present disclosure further provides an interrupt information processing method, where the method is applied to a system that includes an interrupt controller and a virtual machine, where the interrupt controller includes a virtual CPU interrupt interface and an interrupt responding unit, and the method includes receiving, by the interrupt responding unit, Q pieces of first interrupt information sent by a physical device, where Q is an integer greater than or equal to 1, and writing, by the interrupt responding unit, the Q pieces of first interrupt information into the virtual CPU interrupt interface such that after determining that the virtual machine is running, the virtual CPU interrupt interface sends the Q pieces of first interrupt information to a processor corresponding to the virtual machine.

In a first possible implementation manner of the second aspect, the virtual CPU interrupt interface includes a first register and a second register and writing, by the interrupt responding unit, the Q pieces of first interrupt information into the virtual CPU interrupt interface includes writing, by the interrupt responding unit, the Q pieces of first interrupt information into the first register such that the first register sorts the Q pieces of first interrupt information in descending order of priorities to obtain a sorting result, and writes R pieces of first interrupt information with highest priorities in the Q pieces of first interrupt information into the second register according to the sorting result, where after determining that the virtual machine is running, the virtual CPU interrupt interface sends the R pieces of first interrupt information to the processor corresponding to the virtual machine, where R is a positive integer less than or equal to N.

According to a third aspect, an embodiment of the present disclosure provides a virtual machine monitor, applied to a system that includes an interrupt controller, the virtual machine monitor, a specific register, and at least one virtual machine, where the interrupt controller includes at least one virtual CPU interrupt interface, the specific register stores an interrupt vector table of the virtual machine monitor, the interrupt vector table of the virtual machine monitor includes an interrupt processing function that is used to be called by the virtual machine monitor, and the interrupt processing function includes an interrupt number, and the virtual machine monitor includes a receiver configured to receive Q pieces of first interrupt information, where Q is an integer greater than or equal to 1, and a virtual interrupt controller configured to obtain a corresponding interrupt processing function from the specific register according to an interrupt number of each piece of first interrupt information. The virtual interrupt controller is further configured to call the obtained interrupt processing function to obtain M pieces of second interrupt information, where the M pieces of second interrupt information are interrupt information that needs to be sent to a processor corresponding to a virtual machine and that is in the Q pieces of first interrupt information, and M is a positive integer less than or equal to Q, the virtual interrupt controller is further configured to obtain an identifier of a virtual machine corresponding to the M pieces of second interrupt information, and the virtual interrupt controller is further configured to write the M pieces of second interrupt information and the identifier of the virtual machine corresponding to the M pieces of second interrupt information into the virtual CPU interrupt interface such that after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

In a first possible implementation manner of the third aspect, the virtual interrupt controller is configured to buffer the M pieces of second interrupt information, detect a quantity K of third interrupt information currently stored in the virtual CPU interrupt interface, where K is an integer greater than or equal to 0, obtain N pieces of second interrupt information with highest priorities from the M pieces of second interrupt information according to the quantity K of the third interrupt information and a preset interrupt quantity threshold P of the virtual CPU interrupt interface, where P is an integer greater than or equal to 1, and N is less than or equal to a difference between P and K, and write the N pieces of second interrupt information and an identifier of a virtual machine corresponding to the N pieces of second interrupt information into the virtual CPU interrupt interface, where N is less than or equal to the difference between P and K.

With reference to the first possible implementation manner of the third aspect, in a second possible implementation manner of the third aspect, each virtual CPU interrupt interface includes a first register and a second register, and the writing the N pieces of second interrupt information and an identifier of a virtual machine corresponding to the N pieces of second interrupt information into the virtual CPU interrupt interface includes writing the N pieces of second interrupt information into the first register such that the first register sorts the N pieces of second interrupt information in descending order of priorities to obtain a sorting result, and writing R pieces of second interrupt information with highest priorities in the N pieces of second interrupt information into the second register according to the sorting result, where after determining that the virtual machine corresponding to the identifier of the virtual machine is running, the virtual CPU interrupt interface sends the R pieces of second interrupt information to the processor corresponding to the virtual machine, where R is a positive integer less than or equal to N.

In a third possible implementation manner of the third aspect, the virtual interrupt controller is configured to call the obtained interrupt processing function such that the called interrupt processing function starts to run and detects an operation location corresponding to each piece of first interrupt information and location information of each virtual machine so as to obtain M pieces of first interrupt information whose operation locations fall within the location information of the virtual machine, and use the obtained M pieces of first interrupt information as the M pieces of second interrupt information.

According to a fourth aspect, an embodiment of the present disclosure further provides an interrupt controller, applied to a system that includes the interrupt controller and a virtual machine, where the interrupt controller includes a virtual CPU interrupt interface and an interrupt responding unit, where the interrupt responding unit is configured to receive Q pieces of first interrupt information sent by a physical device, where Q is an integer greater than or equal to 1, and the interrupt responding unit is further configured to write the Q pieces of first interrupt information into the virtual CPU interrupt interface such that after determining that the virtual machine is running, the virtual CPU interrupt interface sends the Q pieces of first interrupt information to a processor corresponding to the virtual machine.

In a first possible implementation manner of the fourth aspect, the virtual CPU interrupt interface includes a first register and a second register, and the interrupt responding unit is configured to write the Q pieces of first interrupt information into the first register such that the first register sorts the Q pieces of first interrupt information in descending order of priorities to obtain a sorting result, and writes R pieces of first interrupt information with highest priorities in the Q pieces of first interrupt information into the second register according to the sorting result, where after determining that the virtual machine is running, the virtual CPU interrupt interface sends the R pieces of first interrupt information to the processor corresponding to the virtual machine, where R is a positive integer less than or equal to N.

It may be learned from the foregoing technical solutions that the embodiments of the present disclosure have the following beneficial effects.

A virtual machine monitor may directly call an interrupt processing function in a specific register without using an interrupt processing function in a common interrupt vector table after waiting for a virtual machine to exit. The virtual machine monitor may inject interrupt information into the virtual machine using a virtual CPU interrupt interface of an interrupt controller. In the prior art, an exit event of the virtual machine is caused each time one piece of interrupt information is injected. By comparison, in the method of the embodiments of the present disclosure, interrupt information can be injected into the virtual machine in batches, and therefore, additional performance overheads can be reduced, and an interrupt information processing procedure can be simplified, thereby improving interrupt information processing efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the technical solutions in the present disclosure more comprehensible, the following describes the embodiments of the present disclosure in detail with reference to the accompanying drawings.

It should be clear that the described embodiments are merely some, but not all, of the embodiments of the present disclosure. All other embodiments obtained by a person of ordinary skill in the art based on the embodiments of the present disclosure without creative efforts shall fall within the protection scope of the present disclosure.

An embodiment of the present disclosure provides an interrupt information processing method, where the method is applied to a system that includes an interrupt controller, a virtual machine monitor, a specific register, and at least one virtual machine, where the interrupt controller includes at least one virtual CPU interrupt interface, the specific register stores an interrupt vector table of the virtual machine monitor, the interrupt vector table of the virtual machine monitor includes an interrupt processing function that is used to be called by the virtual machine monitor, and the interrupt processing function includes an interrupt number.

Figure 1:
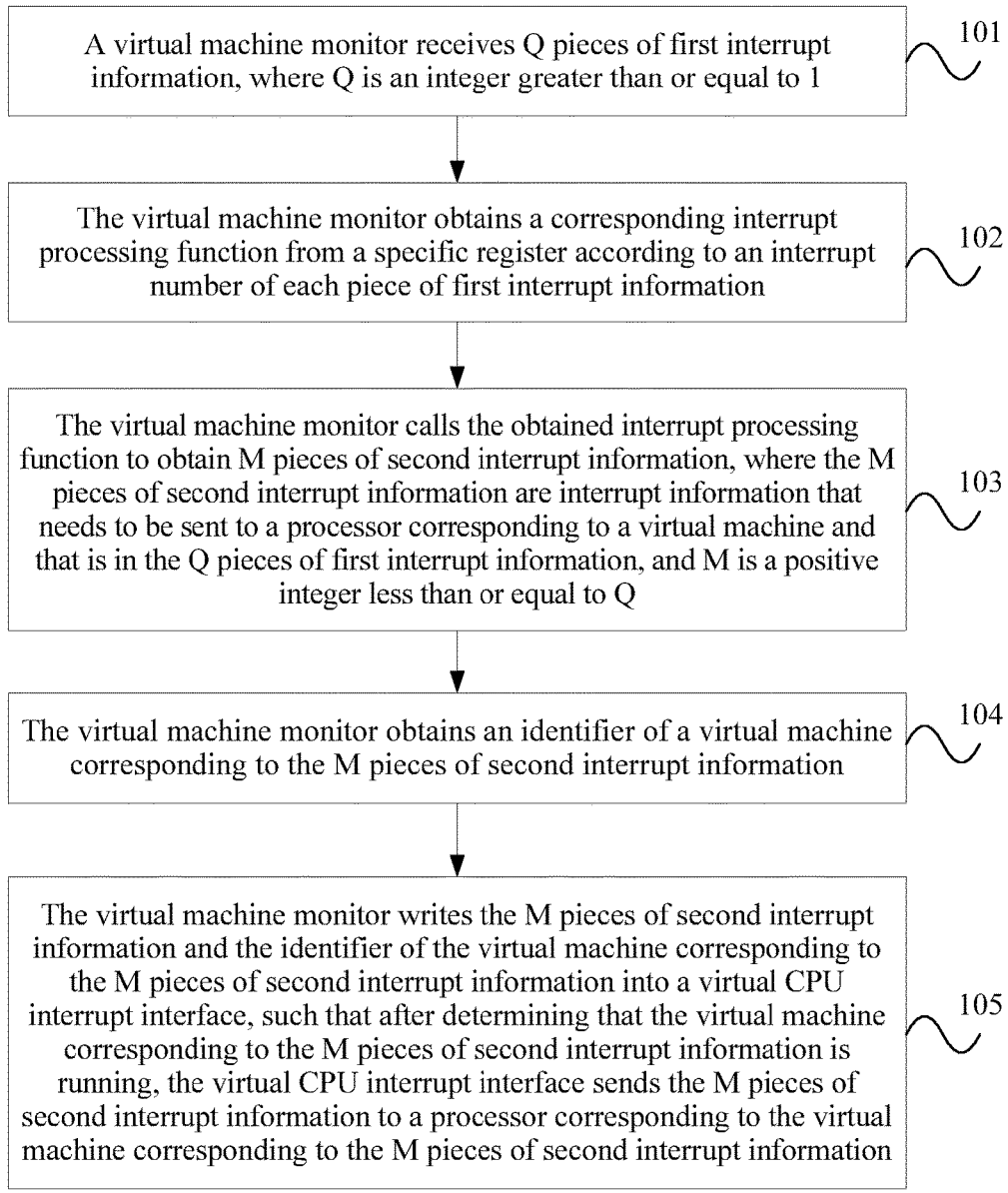
FIG. 1 is a schematic flowchart of a first embodiment of an interrupt information processing method according to an embodiment of the present disclosure.

Referring to FIG. 1, FIG. 1 is a schematic flowchart of a first embodiment of an interrupt information processing method according to an embodiment of the present disclosure. As shown in the figure, the method includes the following steps.

Step 101: The virtual machine monitor receives Q pieces of first interrupt information, where Q is an integer greater than or equal to 1.

Figure 2:
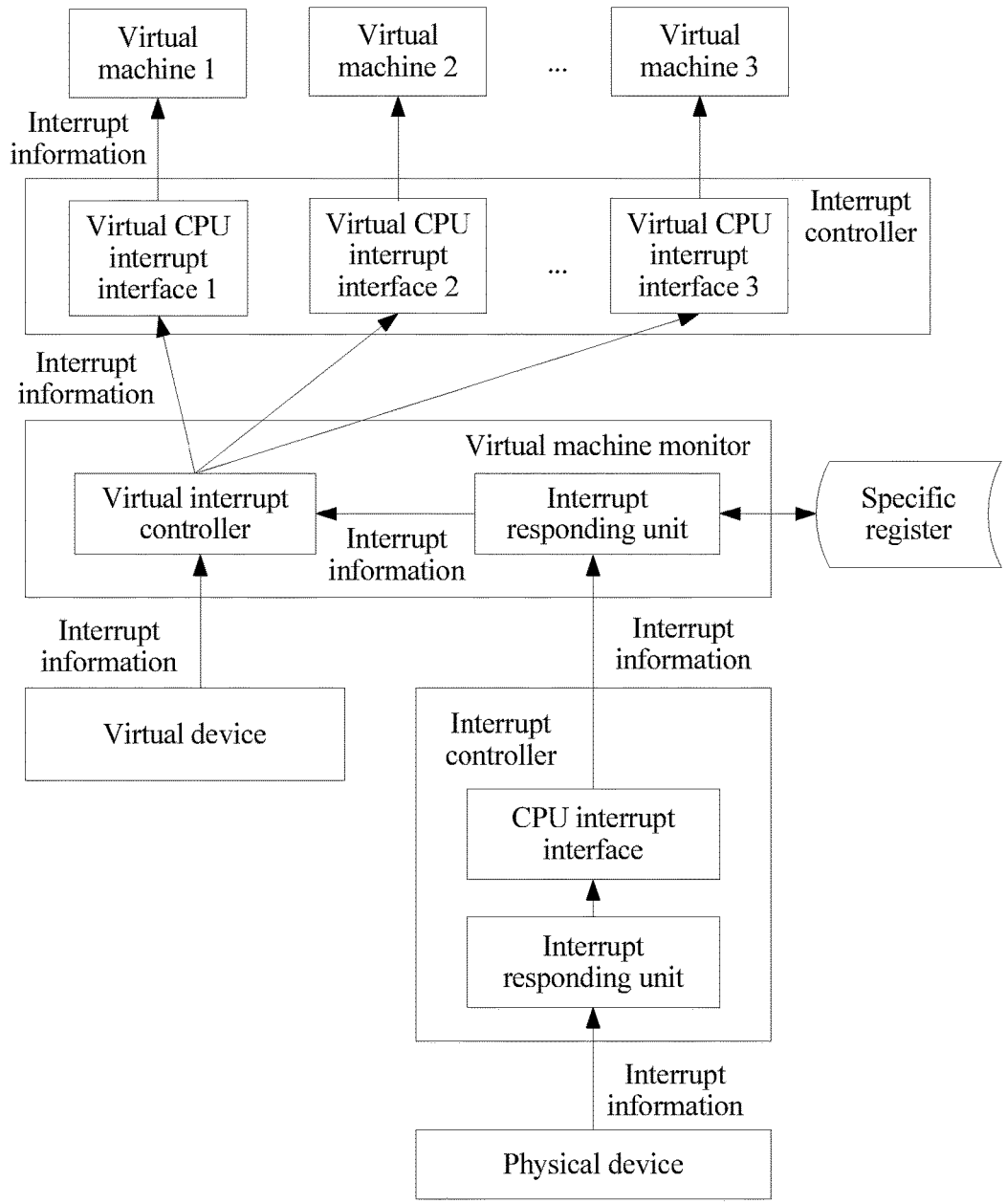
FIG. 2 is a schematic structural diagram of a system to which a first embodiment of an interrupt information processing method is applied according to an embodiment of the present disclosure.

Referring to FIG. 2, FIG. 2 is a schematic structural diagram of a system to which a first embodiment of an interrupt information processing method is applied according to an embodiment of the present disclosure. As shown in FIG. 2, the virtual machine monitor includes a virtual interrupt controller and an interrupt responding unit. In this embodiment, the Q pieces of first interrupt information received by the virtual machine monitor may include virtual interrupt information generated by a virtual device and/or physical interrupt information generated by a physical device.

For example, a method that the virtual machine monitor receives the virtual interrupt information generated by the virtual device may include, as shown in FIG. 2, the virtual device generates the virtual interrupt information, and then the virtual device calls an interface of the virtual interrupt controller in the virtual machine monitor and directly sends the virtual interrupt information generated by the virtual device to the virtual interrupt controller. In this way, the virtual interrupt controller can receive the virtual interrupt information from the virtual device.

For example, a method that the virtual machine monitor receives the physical interrupt information generated by the physical device may include, as shown in FIG. 2, the physical device generates the physical interrupt information, and then sends the physical interrupt information to the interrupt controller. In addition to the foregoing virtual CPU interrupt interface, the interrupt controller includes an interrupt responding unit and a CPU interrupt interface. The interrupt responding unit of the interrupt controller first determines a value of an interrupt masking override (IMO) bit of a preset control register. When the value of the IMO bit of the control register is equal to 1, it indicates that a current mode is a monitor mode (Hyp mode), and the physical interrupt information needs to trap into the virtual machine monitor. Therefore, the interrupt responding unit of the interrupt controller sends the received physical interrupt information to the interrupt responding unit of the virtual machine monitor using the CPU interrupt interface of the interrupt controller, and the interrupt responding unit of the virtual machine monitor calls an interface of the virtual interrupt controller and sends the received physical interrupt information to the virtual interrupt controller of the virtual machine monitor. In this way, the virtual interrupt controller can receive the physical interrupt information sent by the physical device.

Returning now to FIG. 1, Step 102: The virtual machine monitor obtains a corresponding interrupt processing function from the specific register according to an interrupt number of each piece of first interrupt information.

In this embodiment of the present disclosure, a specific register is added to an operating system, where the specific register stores only an interrupt vector table of a virtual machine monitor, and does not store an interrupt vector table of the operating system of a computer or an interrupt vector table of a virtual machine. The interrupt vector table of the virtual machine monitor refers to an interrupt vector table that can be used only by the virtual machine monitor.

The interrupt vector table of the virtual machine monitor includes at least one interrupt processing function that is used to be called by the virtual machine monitor, where each interrupt processing function corresponds to one interrupt number. A method that the interrupt processing function corresponds to the interrupt number is each interrupt processing function includes a corresponding interrupt number.

After receiving the Q pieces of first interrupt information, the virtual interrupt controller of the virtual machine monitor searches, in the interrupt vector table that is of the virtual machine monitor and stored in the specific register, for an interrupt processing function corresponding to the interrupt number of each piece of first interrupt information according to the interrupt number of each piece of first interrupt information. For example, the virtual interrupt controller traverses the interrupt processing function, and when finding that a traversed interrupt processing function includes an interrupt number of one piece of first interrupt information, determines that the interrupt processing function is an interrupt processing function corresponding to the first interrupt information.

Step 103: The virtual machine monitor calls the obtained interrupt processing function to obtain M pieces of second interrupt information, where the M pieces of second interrupt information are interrupt information that needs to be sent to a processor corresponding to a virtual machine and that is in the Q pieces of first interrupt information, and M is a positive integer less than or equal to Q.

The virtual machine monitor calls the obtained interrupt processing function such that the called interrupt processing function starts to run. When running, the interrupt processing function automatically detects an operation location corresponding to the first interrupt information, location information of a virtual machine that is currently running, and location information of each virtual machine, and determines whether the operation location corresponding to the first interrupt information falls with location information of a virtual machine. When an operation location corresponding to one piece of first interrupt information falls with a location range of a virtual machine, it is determined that the first interrupt information is to be sent to the virtual machine for processing. Therefore, after the interrupt processing function automatically performs detection, M pieces of first interrupt information whose operation locations fall within location information of a virtual machine may be obtained. On the contrary, when an operation location corresponding to one piece of first interrupt information does not fall within a location range of a virtual machine, it is determined that the first interrupt information is to be sent to the operating system of the computer for processing.

The virtual machine monitor uses the obtained M pieces of first interrupt information as the M pieces of second interrupt information, that is, the M pieces of second interrupt information are interrupt information that needs to be sent to a processor corresponding to a virtual machine and that is in the Q pieces of first interrupt information.

Step 104: The virtual machine monitor obtains an identifier of a virtual machine corresponding to the M pieces of second interrupt information.

When running, the interrupt processing function called by the virtual interrupt controller in the virtual machine monitor may automatically detect that one piece of first interrupt information is to be sent to which virtual machine for processing. Therefore, the virtual interrupt controller may obtain, according to a correspondence between a virtual machine and an identifier, an identifier of a virtual machine to which the first interrupt information needs to be sent. For example, the identifier of the virtual machine may be an identification (ID) of the virtual machine.

Step 105: The virtual machine monitor writes the M pieces of second interrupt information and the identifier of the virtual machine corresponding to the M pieces of second interrupt information into the virtual CPU interrupt interface such that after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

In this embodiment of the present disclosure, a method that the virtual machine monitor writes the M pieces of second interrupt information and the identifier of the virtual machine corresponding to the M pieces of second interrupt information into the virtual CPU interrupt interface may be as follows.

The virtual machine monitor buffers the obtained M pieces of second interrupt information, and then detects a quantity K of third interrupt information currently stored in the virtual CPU interrupt interface, where K is an integer greater than or equal to 0. The virtual machine monitor obtains N pieces of second interrupt information with highest priorities from the M pieces of second interrupt information according to the quantity K of the third interrupt information and a preset interrupt quantity threshold P of the virtual CPU interrupt interface, where P is an integer greater than or equal to 1, and N is less than or equal to a difference between P and K, and the virtual machine monitor writes the N pieces of second interrupt information and an identifier of a virtual machine corresponding to the N pieces of second interrupt information into the virtual CPU interrupt interface, where N is less than or equal to the difference between P and K.

Preferably, for the M pieces of second interrupt information obtained by the virtual interrupt controller, when writing second interrupt information into the virtual CPU interrupt interface of the interrupt controller for the first time, the virtual interrupt controller sorts the M pieces of second interrupt information in descending order of priorities, then obtains P pieces of second interrupt information with highest priorities from the M pieces of second interrupt information according to the preset interrupt quantity threshold P of the virtual CPU interrupt interface, and writes the obtained P pieces of second interrupt information and an identifier of a virtual machine corresponding to the P pieces of second interrupt information into the virtual CPU interrupt interface of the interrupt controller such that the quantity K of the second interrupt information stored in the virtual CPU interrupt interface is equal to the interrupt quantity threshold P of the virtual CPU interrupt interface.

For example, second interrupt information currently stored in the virtual CPU interrupt interface may be maintained by a first register and a second register, where the two registers can store only 64 pieces of second interrupt information, and the second interrupt information stored in the two registers includes second interrupt information in a to-be-processed state (for example, a Pending state) and second interrupt information in a processing state (for example, an Active state); therefore, the interrupt quantity threshold P of the virtual CPU interrupt interface is equal to 64.

The virtual machine monitor may enable multiple virtual machines at the same time, and therefore a lot of second interrupt information cannot be processed in time. Therefore, when the quantity M of second interrupt information received by the virtual interrupt controller is greater than the interrupt quantity threshold P of the virtual CPU interrupt interface, some pieces of second interrupt information need to be buffered by the virtual interrupt controller so as to quickly write the second interrupt information into the virtual CPU interrupt interface.

For example, the virtual interrupt controller may maintain two ordered queues, such as a first interrupt queue and a second interrupt queue, where the first interrupt queue stores interrupt information in a to-be-processed state, the second interrupt queue stores interrupt information in a processing state, and each element in the two queues records corresponding second interrupt information that needs to be written into the virtual CPU interrupt interface and a location that is of the second interrupt information and that is in the virtual CPU interrupt interface, where the location is used to identify a priority, of the second interrupt information, in the virtual CPU interrupt interface. After interacting with the virtual CPU interrupt interface each time, the virtual interrupt controller updates the first interrupt queue and the second interrupt queue.

Starting from the second time when the virtual interrupt controller writes the second interrupt information into the virtual CPU interrupt interface of the interrupt controller, before writing the second interrupt information, the virtual interrupt controller needs to detect a quantity K of third interrupt information currently stored in the virtual CPU interrupt interface.

When the virtual interrupt controller detects that the quantity K of the third interrupt information is equal to the interrupt quantity threshold P of the virtual CPU interrupt interface, and there is new second interrupt information of a higher priority that needs to be written, the virtual interrupt controller first extracts S pieces of third interrupt information of lowest priorities from the K pieces of third interrupt information, where the extracted third interrupt information may be third interrupt information in a to-be-processed state, or may be third interrupt information in a processing state. Then, the virtual interrupt controller writes S pieces of second interrupt information with highest priorities in the M pieces of second interrupt information into the virtual CPU interrupt interface, where S is an integer greater than or equal to 1, and S is less than or equal to K. For example, a quantity of the third interrupt information extracted from the K pieces of third interrupt information is equal to a quantity of written second interrupt information. After the two registers of the virtual CPU interrupt interface are fully written with interrupt information, a quantity of third interrupt information extracted from the two registers is equal to a quantity of second interrupt information that needs to be written into the two registers so as to make full use of storage space of the registers. Preferably, when the virtual interrupt controller extracts the S pieces of third interrupt information of lowest priorities from the interrupt information, after the third interrupt information is extracted, in the two registers, a quantity of third interrupt information in a to-be-processed state is equal to a quantity of third interrupt information in a processing state.

When the virtual interrupt controller detects that the quantity K of the third interrupt information is less than P, N pieces of second interrupt information with highest priorities in the M pieces of second interrupt information may be directly written into the virtual CPU interrupt interface, where N is less than or equal to a difference between P and K. For example, when third interrupt information in a register of the virtual CPU interrupt interface is processed, the third interrupt information is cleared such that the virtual interrupt controller can write second interrupt information of a highest priority in the first interrupt queue or the second interrupt queue into the virtual CPU interrupt interface.

For example, each virtual CPU interrupt interface may include a first register and a second register, a method that the virtual machine monitor writes the N pieces of second interrupt information and an identifier of a virtual machine corresponding to the N pieces of second interrupt information into the virtual CPU interrupt interface may be as follows.

The virtual machine monitor writes the N pieces of second interrupt information into the first register such that the first register sorts the N pieces of second interrupt information in descending order of priorities to obtain a sorting result and writes R pieces of second interrupt information with highest priorities in the N pieces of second interrupt information into the second register according to the sorting result, where after determining that the virtual machine corresponding to the identifier of the virtual machine is running, the virtual CPU interrupt interface sends the R pieces of second interrupt information to the processor corresponding to the virtual machine, where R is a positive integer less than or equal to N.

In this embodiment of the present disclosure, after the virtual machine monitor writes the M pieces of second interrupt information and the identifier of the virtual machine corresponding to the M pieces of second interrupt information into the virtual CPU interrupt interface, after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

A register pre-stores an interrupt vector table, and a pointer of the register may point to addresses of different interrupt vector tables. When the pointer points to an address of an interrupt vector table corresponding to a virtual machine, the virtual machine may use an interrupt processing function included in the interrupt vector table. The interrupt vector table stores a correspondence between an identifier of interrupt information and an interrupt processing function, and the virtual machine may obtain, according to the correspondence, an interrupt processing function corresponding to interrupt information, and then call the interrupt processing function to process interrupt information obtained from a virtual CPU interrupt interface. After the virtual machine finishes processing the interrupt information, the interrupt information stored in the virtual CPU interrupt interface is cleared, and a processing procedure for the interrupt information ends.

In this embodiment, a virtual machine monitor may directly call an interrupt processing function in a specific register, without needing to wait a virtual machine to exit and then use an interrupt processing function in a common interrupt vector table. The virtual machine monitor may inject interrupt information into the virtual machine using a virtual CPU interrupt interface of an interrupt controller. In the prior art, an exit event of the virtual machine is caused each time one piece of interrupt information is injected. By comparison, in the method of this embodiment, interrupt information can be injected into the virtual machine in batches, and therefore, additional performance overheads can be reduced, and an interrupt information processing procedure can be simplified, thereby improving interrupt information processing efficiency. In this embodiment, in the virtual machine monitor, Advanced Reduced Instruction-Set Computer Machine (ARM) hardware instead of software is used to implement two interrupt queues, and therefore complexity of the virtual machine monitor can be reduced. In a method in the prior art, a virtual machine controller modifies an interrupt vector table; by comparison, in the method of this embodiment, an exclusive interrupt processing function and the virtual CPU interrupt interface may be used to directly inject the interrupt information into the virtual machine, without needing to modify an upper-layer operating system, which is transparent.

An embodiment of the present disclosure further provides an interrupt information processing method, where the method is applied to a system that includes an interrupt controller and a virtual machine, and the interrupt controller includes a virtual CPU interrupt interface and an interrupt responding unit.

Figure 3:
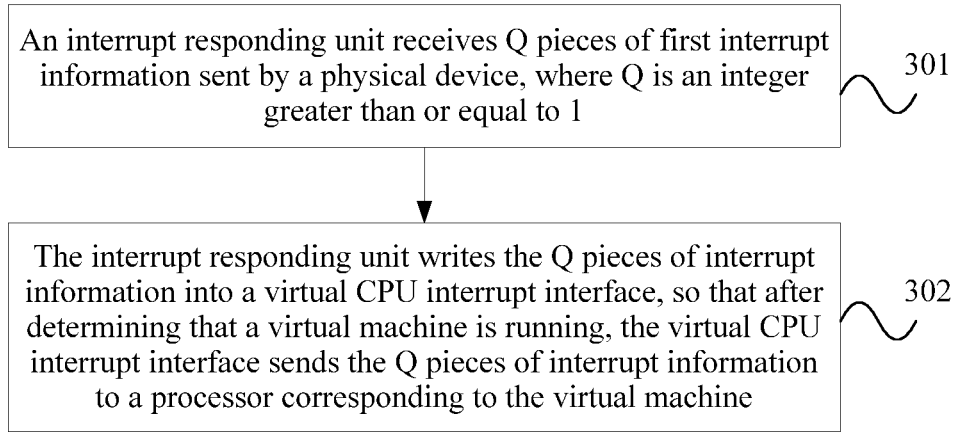
FIG. 3 is a schematic flowchart of a second embodiment of an interrupt information processing method according to an embodiment of the present disclosure.

Referring to FIG. 3, FIG. 3 is a schematic flowchart of a second embodiment of an interrupt information processing method according to an embodiment of the present disclosure. As shown in the figure, the method includes the following steps.

Step 301: The interrupt responding unit receives Q pieces of first interrupt information sent by a physical device, where Q is an integer greater than or equal to 1.

Figure 4:
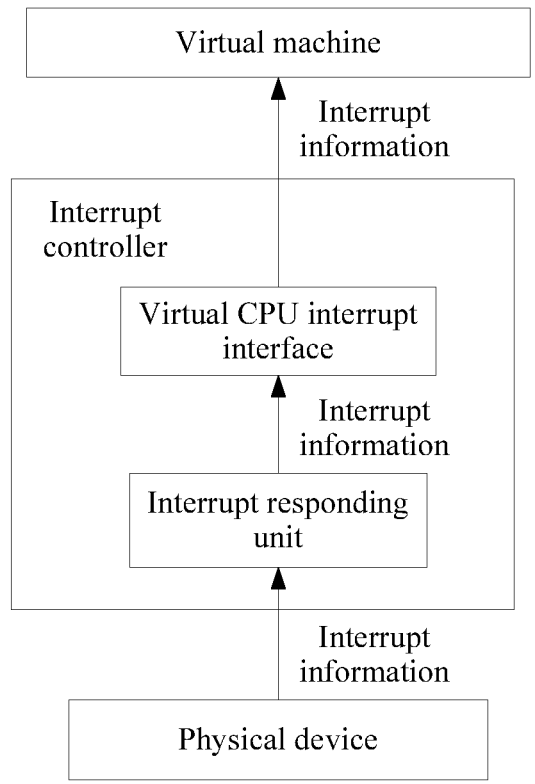
FIG. 4 is a schematic structural diagram of a system to which a second embodiment of an interrupt information processing method is applied according to an embodiment of the present disclosure.

Referring to FIG. 4, FIG. 4 is a schematic structural diagram of a system to which a second embodiment of an interrupt information processing method is applied according to an embodiment of the present disclosure. As shown in FIG. 4, the Q pieces of first interrupt information received by the interrupt controller may include physical interrupt information generated by the physical device.

For example, a method that the interrupt controller receives the physical interrupt information generated by the physical device may include, as shown in FIG. 4, the physical device generates Q pieces of physical interrupt information, and then sends the Q pieces of physical interrupt information to the interrupt controller, and the interrupt responding unit in the interrupt controller receives the Q pieces of physical interrupt information. The interrupt responding unit of the interrupt controller determines a value of an IMO bit of a preset control register. When the value of the IMO bit of the control register is not equal to 1, for example, the value of the IMO bit is equal to 0, it indicates that a current mode is a non-monitor mode, and the physical interrupt information does not need to trap into a virtual machine monitor. Therefore, the system to which this embodiment is applied does not include a virtual machine monitor.

Step 302: The interrupt responding unit writes the Q pieces of first interrupt information into the virtual CPU interrupt interface such that after determining that the virtual machine is running, the virtual CPU interrupt interface sends the Q pieces of first interrupt information to a processor corresponding to the virtual machine.

The virtual CPU interrupt interface may include a first register and a second register, where the interrupt responding unit writes the Q pieces of first interrupt information into the first register such that the first register sorts the Q pieces of first interrupt information in descending order of priorities to obtain a sorting result, and writes R pieces of first interrupt information with highest priorities in the Q pieces of first interrupt information into the second register according to the sorting result, where after determining that the virtual machine is running, the virtual CPU interrupt interface sends the R pieces of first interrupt information to the processor corresponding to the virtual machine, where R is a positive integer less than or equal to N.

A register pre-stores an interrupt vector table, and a pointer of the register may point to addresses of different interrupt vector tables. When the pointer points to an address of an interrupt vector table corresponding to a virtual machine, the virtual machine may use an interrupt processing function included in the interrupt vector table. The interrupt vector table stores a correspondence between an identifier of interrupt information and an interrupt processing function, and the virtual machine may obtain, according to the correspondence, an interrupt processing function corresponding to interrupt information, and then call the interrupt processing function to process interrupt information obtained from a virtual CPU interrupt interface. After the virtual machine finishes processing the interrupt information, the interrupt information stored in the virtual CPU interrupt interface is cleared, and a processing procedure for the interrupt information ends.

In this embodiment, a mode is set to a non-trap-into virtual machine monitor mode in advance such that an interrupt controller can directly inject interrupt information into a virtual machine using a virtual CPU interrupt interface of the interrupt controller so as to implement that, in a non-trap-into virtual machine monitor scenario, the virtual machine can still obtain the interrupt information, thereby simplifying an interrupt information processing procedure and improving interrupt information processing efficiency.

An embodiment of the present disclosure further provides an apparatus embodiment that implements the steps and the methods in the foregoing method embodiments.

Figure 5:
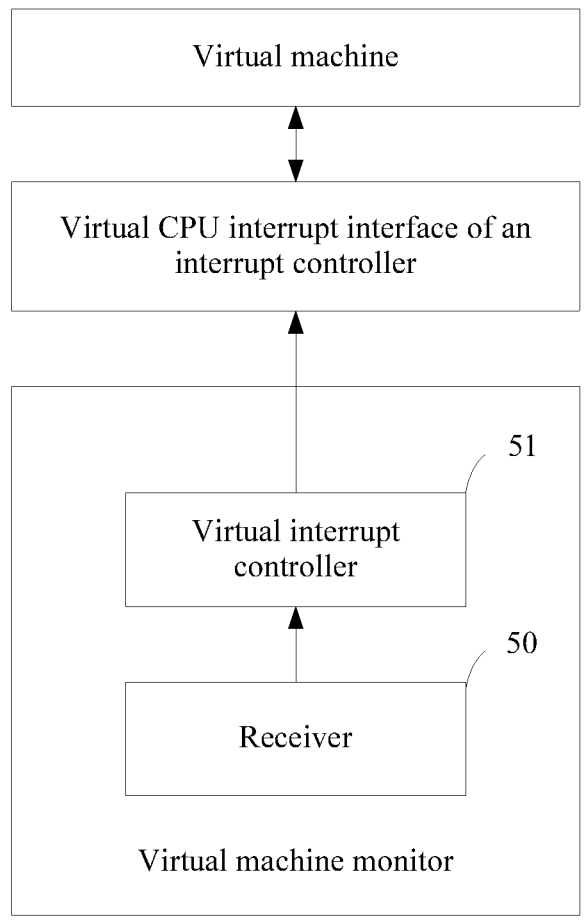
FIG. 5 is a functional block diagram of a virtual machine monitor according to an embodiment of the present disclosure.

Referring to FIG. 5, FIG. 5 is a functional block diagram of a virtual machine monitor according to an embodiment of the present disclosure. As shown in the figure, the virtual machine monitor is applied to a system that includes an interrupt controller, the virtual machine monitor, a specific register, and at least one virtual machine, where the interrupt controller includes at least one virtual CPU interrupt interface, the specific register stores an interrupt vector table of the virtual machine monitor, the interrupt vector table of the virtual machine monitor includes an interrupt processing function that is used to be called by the virtual machine monitor, and the interrupt processing function includes an interrupt number. The virtual machine monitor includes a receiver 50 configured to receive Q pieces of first interrupt information, where Q is an integer greater than or equal to 1. A virtual interrupt controller 51 configured to obtain a corresponding interrupt processing function from the specific register according to an interrupt number of each piece of first interrupt information, where the virtual interrupt controller 51 is further configured to call the obtained interrupt processing function to obtain M pieces of second interrupt information, where the M pieces of second interrupt information are interrupt information that needs to be sent to a processor corresponding to a virtual machine and that is in the Q pieces of first interrupt information, and M is a positive integer less than or equal to Q. The virtual interrupt controller 51 is further configured to obtain an identifier of a virtual machine corresponding to the M pieces of second interrupt information. The virtual interrupt controller 51 is further configured to write the M pieces of second interrupt information and the identifier of the virtual machine corresponding to the M pieces of second interrupt information into the virtual CPU interrupt interface such that after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

Preferably, the virtual interrupt controller 51 is configured to buffer the M pieces of second interrupt information, detect a quantity K of third interrupt information currently stored in the virtual CPU interrupt interface, where K is an integer greater than or equal to 0, obtain N pieces of second interrupt information with highest priorities from the M pieces of second interrupt information according to the quantity K of the third interrupt information and a preset interrupt quantity threshold P of the virtual CPU interrupt interface, where P is an integer greater than or equal to 1, and N is less than or equal to a difference between P and K, and write the N pieces of second interrupt information and an identifier of a virtual machine corresponding to the N pieces of second interrupt information into the virtual CPU interrupt interface, where N is less than or equal to the difference between P and K.

Preferably, each virtual CPU interrupt interface includes a first register and a second register and writing the N pieces of second interrupt information and an identifier of a virtual machine corresponding to the N pieces of second interrupt information into the virtual CPU interrupt interface includes writing the N pieces of second interrupt information into the first register such that the first register sorts the N pieces of second interrupt information in descending order of priorities to obtain a sorting result and writing R pieces of second interrupt information with highest priorities in the N pieces of second interrupt information into the second register according to the sorting result, where after determining that the virtual machine corresponding to the identifier of the virtual machine is running, the virtual CPU interrupt interface sends the R pieces of second interrupt information to the processor corresponding to the virtual machine, where R is a positive integer less than or equal to N.

Preferably, the virtual interrupt controller 51 is configured to call the obtained interrupt processing function such that the called interrupt processing function starts to run and detects an operation location corresponding to each piece of first interrupt information and location information of each virtual machine so as to obtain M pieces of first interrupt information whose operation locations fall within the location information of the virtual machine and use the obtained M pieces of first interrupt information as the M pieces of second interrupt information.

Figure 6:
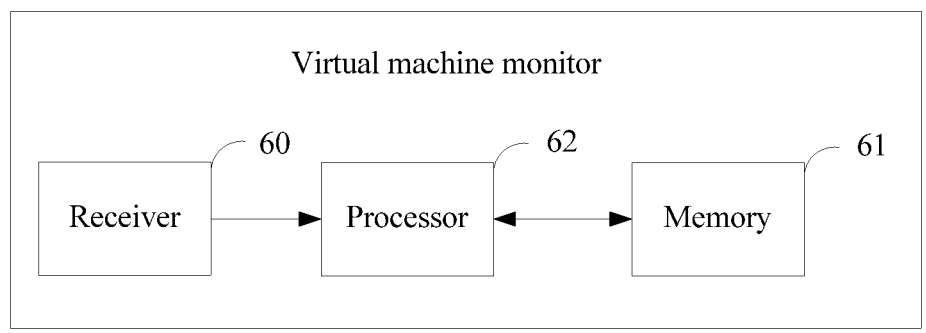
FIG. 6 is a schematic structural diagram of a virtual machine monitor according to an embodiment of the present disclosure.

Referring to FIG. 6, FIG. 6 is a schematic structural diagram of a virtual machine monitor according to an embodiment of the present disclosure. As shown in the figure, the virtual machine monitor includes a receiver 60 configured to receive Q pieces of first interrupt information, where Q is an integer greater than or equal to 1, a memory 61 configured to store one or more groups of program code, and a processor 62, separately coupled to the memory 61 and the receiver 60, and configured to call the program code stored in the memory 61 to execute the following method shown in FIG. 1, including, obtaining a corresponding interrupt processing function from the specific register according to an interrupt number of each piece of first interrupt information, calling the obtained interrupt processing function to obtain M pieces of second interrupt information, where the M pieces of second interrupt information are interrupt information that needs to be sent to a processor corresponding to a virtual machine and that is in the Q pieces of first interrupt information, and M is a positive integer less than or equal to Q, obtaining an identifier of a virtual machine corresponding to the M pieces of second interrupt information, and writing the M pieces of second interrupt information and the identifier of the virtual machine corresponding to the M pieces of second interrupt information into the virtual CPU interrupt interface such that after determining that the virtual machine corresponding to the M pieces of second interrupt information is running, the virtual CPU interrupt interface sends the M pieces of second interrupt information to a processor corresponding to the virtual machine corresponding to the M pieces of second interrupt information.

Figure 7:
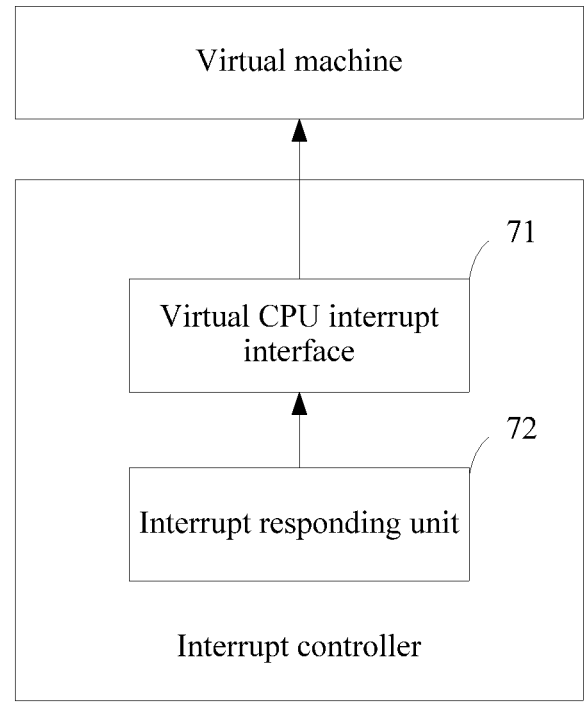
FIG. 7 is a functional block diagram of an interrupt controller according to an embodiment of the present disclosure.

Referring to FIG. 7, FIG. 7 is a functional block diagram of an interrupt controller according to an embodiment of the present disclosure. As shown in the figure, the interrupt controller is applied to a system that includes the interrupt controller and a virtual machine, where the interrupt controller includes a virtual CPU interrupt interface 71 and an interrupt responding unit 72, where the interrupt responding unit 72 is configured to receive Q pieces of first interrupt information sent by a physical device, where Q is an integer greater than or equal to 1. The interrupt responding unit 72 is further configured to write the Q pieces of first interrupt information into the virtual CPU interrupt interface 71 such that after determining that the virtual machine is running, the virtual CPU interrupt interface 71 sends the Q pieces of first interrupt information to a processor corresponding to the virtual machine.

Preferably, the virtual CPU interrupt interface includes a first register and a second register, and the interrupt responding unit 72 is configured to write the Q pieces of first interrupt information into the first register such that the first register sorts the Q pieces of first interrupt information in descending order of priorities to obtain a sorting result, and writes R pieces of first interrupt information with highest priorities in the Q pieces of first interrupt information into the second register according to the sorting result, where after determining that the virtual machine is running, the virtual CPU interrupt interface sends the R pieces of first interrupt information to the processor corresponding to the virtual machine, where R is a positive integer less than or equal to N.

Figure 8:
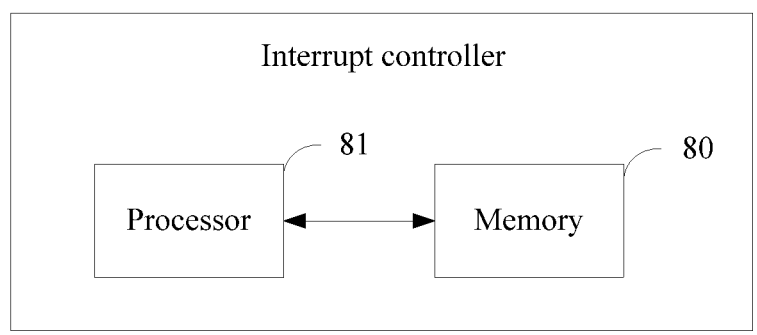
FIG. 8 is a schematic structural diagram of an interrupt controller according to an embodiment of the present disclosure.

Referring to FIG. 8, FIG. 8 is a schematic structural diagram of an interrupt controller according to an embodiment of the present disclosure. As shown in the figure, the interrupt controller includes a memory 80 configured to store one or more groups of program code, and a processor 81, coupled to the memory 80 and configured to call the program code stored in the memory 80 to execute the following method shown in FIG. 3, including, receiving Q pieces of first interrupt information sent by a physical device, where Q is an integer greater than or equal to 1, and writing the Q pieces of first interrupt information into a virtual CPU interrupt interface such that after determining that the virtual machine is running, the virtual CPU interrupt interface sends the Q pieces of first interrupt information to a processor corresponding to the virtual machine.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An interrupt information processing method for a system comprising an interrupt controller, a virtual machine monitor, a register, and at least one virtual machine, the method comprising:
   receiving, by the virtual machine monitor, Q pieces of first interrupt information, the first interrupt information comprising information for a corresponding interrupt processing function and Q being an integer greater than or equal to one;
   obtaining, by the virtual machine monitor, an interrupt processing function from the register according to an interrupt number of each piece of first interrupt information, the interrupt processing function corresponding to the interrupt number of each of the pieces of the first interrupt information;
   calling, by the virtual machine monitor, the interrupt processing function obtained and obtaining M pieces of second interrupt information, the second interrupt information comprising an identifier of a virtual machine, the M pieces of the second interrupt information being interrupt information in the Q pieces of the first interrupt information to be sent to a processor corresponding to the virtual machine of the at least one virtual machine, M being a positive integer less than or equal to Q;
   obtaining, by the virtual machine monitor, an identifier of the virtual machine corresponding to the M pieces of second interrupt information;
   writing, by the virtual machine monitor, the M pieces of second interrupt information and the identifier of the virtual machine corresponding to the M pieces of the second interrupt information into a virtual CPU interrupt interface; and
   sending, by a virtual central processing unit (CPU) interrupt interface of the interrupt controller, the M pieces of the second interrupt information to a processor running the virtual machine corresponding to the M pieces of the second interrupt information after the virtual machine corresponding to the M pieces of the second interrupt information is running.

2. The method of claim 1, wherein writing, by the virtual machine monitor, the M pieces of the second interrupt information and the identifier of the virtual machine corresponding to the M pieces of the second interrupt information into the virtual CPU interrupt interface comprises:
   buffering, by the virtual machine monitor, the M pieces of the second interrupt information;
   detecting, by the virtual machine monitor, a quantity K of third interrupt information stored in the virtual CPU interrupt interface, the third interrupt information comprising priority information of the second interrupt information and K being an integer greater than or equal to zero;
   obtaining, by the virtual machine monitor, N pieces of the second interrupt information with highest priorities from the M pieces of the second interrupt information according to the quantity K of the third interrupt information and a preset interrupt quantity threshold P of the virtual CPU interrupt interface, P being an integer greater than or equal to one and N being less than or equal to a difference between P and K; and
   writing, by the virtual machine monitor, the N pieces of the second interrupt information and an identifier of the virtual machine corresponding to the N pieces of the second interrupt information into the virtual CPU interrupt interface.

3. The method of claim 2, wherein each virtual CPU interrupt interface comprises a first register and a second register, and writing, by the virtual machine monitor, the N pieces of the second interrupt information and the identifier of the virtual machine corresponding to the N pieces of the second interrupt information into the virtual CPU interrupt interface comprises:
   writing, by the virtual machine monitor, the N pieces of the second interrupt information into the first register and sorting the N pieces of the second interrupt information in descending order of priorities to obtain a sorting result; and
   writing R pieces of the second interrupt information with highest priorities in the N pieces of the second interrupt information into the second register according to the sorting result, the virtual CPU interrupt interface sending the R pieces of the second interrupt information to the processor of the virtual machine corresponding to the N pieces of the second interrupt information after determining that the virtual machine corresponding to the identifier is running, R being a positive integer less than or equal to N.

4. The method of claim 1, wherein calling, by the virtual machine monitor, the interrupt processing function to obtain M pieces of the second interrupt information comprises:
- calling, by the virtual machine monitor, the interrupt processing function obtained and detecting an operation location corresponding to each piece of the first interrupt information and location information of each virtual machine so as to obtain M pieces of the first interrupt information whose operation locations fall within the location information of each of the virtual machines; and
- using, by the virtual machine monitor, the M pieces of the first interrupt information obtained as the M pieces of the second interrupt information.

5. An interrupt information processing method for a system that comprises an interrupt controller and a virtual machine, the method comprising:
- receiving, by a receiver, Q pieces of first interrupt information from a physical device, the first interrupt information comprising information for a corresponding interrupt processing function and Q being an integer greater than or equal to one; and
- writing, by a processor, the Q pieces of first interrupt information into a virtual central processing unit (CPU) interrupt interface comprising a first register and a second register, writing the Q pieces into the virtual CPU comprising:
  - writing, by an interrupt responding unit, the Q pieces of the first interrupt information into the first register such that the first register sorts the Q pieces of the first interrupt information in descending order of priorities to obtain a sorting result; and
  - writing R pieces of first interrupt information with highest priorities in the Q pieces of the first interrupt information into the second register according to the sorting result, the virtual CPU interrupt interface sending the R pieces of first interrupt information to the processor corresponding to the virtual machine after determining that the virtual machine is running, R being a positive integer less than or equal to N, N being greater than or equal to zero; and
- sending the Q pieces of first interrupt information to a processor corresponding to a virtual machine after determining the virtual machine is running.

6. A device for interrupt information processing, comprising:
- a memory configured to store instructions;
- a receiver coupled to the memory and configured to receive Q pieces of first interrupt information, the first interrupt information comprising information for a corresponding interrupt processing function and Q being an integer greater than or equal to one; and
- a processor coupled to the memory and the receiver and configured to execute the instructions, the instructions causing the processor to be configured to:
  - obtain a interrupt processing function from a register according to an interrupt number of each piece of first interrupt information, the interrupt processing function corresponding to the interrupt number of each of the pieces of the first interrupt information;
  - call the interrupt processing function obtained and obtaining M pieces of second interrupt information, the second interrupt information comprising an identifier of a virtual machine of at least one virtual machine, the M pieces of the second interrupt information being interrupt information in the Q pieces of the first interrupt information to be sent to another processor corresponding to the virtual machine of the at least one virtual machine, M being a positive integer less than or equal to Q;
  - obtain an identifier of one of the virtual machine corresponding to the M pieces of the second interrupt information;
  - write the M pieces of the second interrupt information and the identifier of the one of the virtual machine corresponding to the M pieces of the second interrupt information into a virtual CPU interrupt interface; and
- a virtual central processing unit (CPU) interrupt interface of an interrupt controller coupled to the processor and configured to send the M pieces of second interrupt information to the other processor corresponding to the virtual machine running the M pieces of the second interrupt information after the virtual machine corresponding to the M pieces of the second interrupt information is running.

7. The device of claim 6, wherein the instructions further cause the processor to be configured to:
- buffer the M pieces of the second interrupt information;
- detect a quantity K of third interrupt information stored in the virtual CPU interrupt interface, the third interrupt information comprising priority information of the second interrupt information and K being an integer greater than or equal to zero;
- obtain N pieces of the second interrupt information with highest priorities from the M pieces of the second interrupt information according to the quantity K of the third interrupt information and a preset interrupt quantity threshold P of the virtual CPU interrupt interface, P being an integer greater than or equal to one and N being less than or equal to a difference between P and K; and
- write the N pieces of the second interrupt information and an identifier of the virtual machine corresponding to the N pieces of the second interrupt information into the virtual CPU interrupt interface.

8. The device of claim 7, wherein each virtual CPU interrupt interface comprises a first register and a second register, the instructions further causing the processor to be configured to:
- write the N pieces of the second interrupt information into the first register and sort the N pieces of the second interrupt information in descending order of priorities to obtain a sorting result; and
- write R pieces of the second interrupt information with highest priorities in the N pieces of the second interrupt information into the second register according to the sorting result, the virtual CPU interrupt interface sending the R pieces of the second interrupt information to the processor of the virtual machine corresponding to the N pieces of the second interrupt information after determining that the virtual machine corresponding to the identifier is running, and R is a positive integer less than or equal to N.

9. The device of claim 6, wherein the instructions further cause the processor to be configured to:
- call the interrupt processing function obtained and detect an operation location corresponding to each piece of the first interrupt information and location information of each virtual machine so as to obtain M pieces of the first interrupt information whose operation locations fall within the location information of each of the virtual machines; and use the M pieces of the first interrupt information obtained as the M pieces of the second interrupt information.

10. A device for interrupt information processing, comprising:
a memory configured to store instructions;
a receiver coupled to the memory and configured to receive Q pieces of first interrupt information from a physical device, the first interrupt information comprising information for a corresponding interrupt processing function and Q being an integer greater than or equal to one; and
a processor coupled to the memory and the receiver and configured to execute the instructions, the instructions causing the processor to be configured to:
write the Q pieces of the first interrupt information into a virtual central processing unit (CPU) interrupt interface; and
send the Q pieces of the first interrupt information to a another processor corresponding to the virtual machine after determining that the virtual machine is running.

11. The device of claim 10, wherein the virtual CPU interrupt interface comprises a first register and a second register, the processor being further configured to:
write the Q pieces of the first interrupt information into the first register such that the first register sorts the Q pieces of the first interrupt information in descending order of priorities to obtain a sorting results; and
write R pieces of the first interrupt information with highest priorities in the Q pieces of the first interrupt information into the second register according to the sorting result, the virtual CPU interrupt interface sending the R pieces of the first interrupt information to the other processor corresponding to the virtual machine after determining that the virtual machine is running, R being a positive integer less than or equal to N, N being greater than or equal to zero.

\* \* \* \* \*